(12) United States Patent
Hall

(10) Patent No.: US 7,174,849 B1
(45) Date of Patent: Feb. 13, 2007

(54) AUTOMATIC AQUARIUM FEEDER APPARATUS

(76) Inventor: Gary P. Hall, W. 260 N. 5985 Mary Hill Rd., Sussex, WI (US) 53089

( * ) Notice: Subject to any disclaimer, the term of this patent is extended or adjusted under 35 U.S.C. 154(b) by 0 days.

(21) Appl. No.: 11/281,980

(22) Filed: Nov. 18, 2005

(51) Int. Cl.
A01K 61/02 (2006.01)

(52) U.S. Cl. .................................................. 119/51.04

(58) Field of Classification Search ............. 119/51.04, 119/51.01
See application file for complete search history.

(56) References Cited

U.S. PATENT DOCUMENTS

| | | | | |
|---|---|---|---|---|
| 2,772,659 A | * | 12/1956 | Tennis | 119/51.04 |
| 3,022,767 A | * | 2/1962 | Malek | 119/51.11 |
| 3,043,479 A | * | 7/1962 | Gaukstern | 222/129 |
| 4,270,489 A | * | 6/1981 | Joronen | 119/51.04 |
| 5,046,455 A | | 9/1991 | Christiansen et al. | |
| 5,199,381 A | * | 4/1993 | Masopust | 119/51.04 |
| D338,287 S | | 8/1993 | Tonner | |
| 5,490,481 A | | 2/1996 | Strong | |
| 5,873,326 A | | 2/1999 | Davet et al. | |
| 6,082,299 A | | 7/2000 | Halford | |
| 6,694,917 B1 | * | 2/2004 | Wang | 119/51.11 |

\* cited by examiner

Primary Examiner—Son T. Nguyen
(74) Attorney, Agent, or Firm—Donald R. Schoonover

(57) ABSTRACT

An automatic aquarium feeder apparatus including a body unit having a platform element; a platform wall on the platform element defining a cavity; a clamping mechanism for clamping the platform element to the walls of an aquarium; a drive mechanism including a battery-powered motor; and a food dispensing element having one or more first slots through the platform element, and a disk element rotatably driven by the motor and having one or more second slots that are alignable with the one or more first slots. Food in the cavity gravitationally drops through the first and second slots when aligned. The drive mechanism may include an alternating power on/power off timing mechanism.

7 Claims, 1 Drawing Sheet

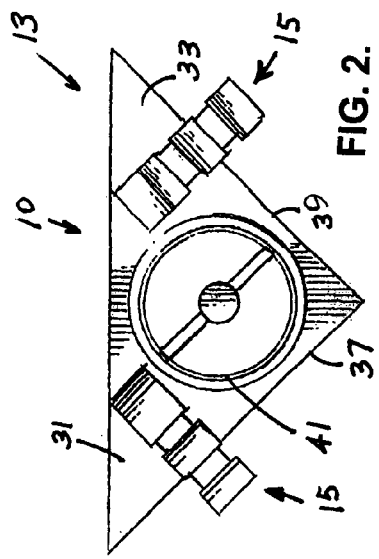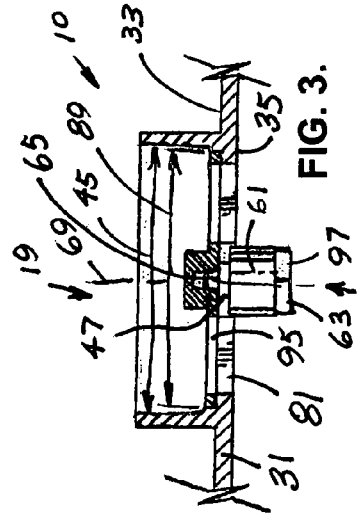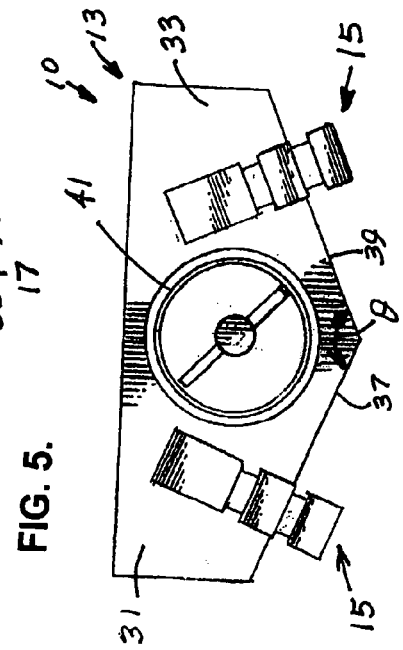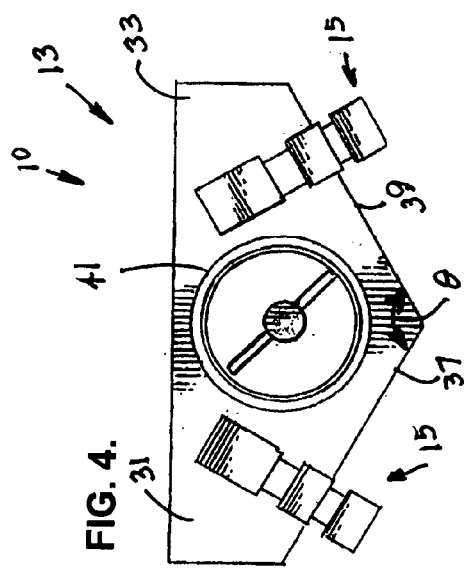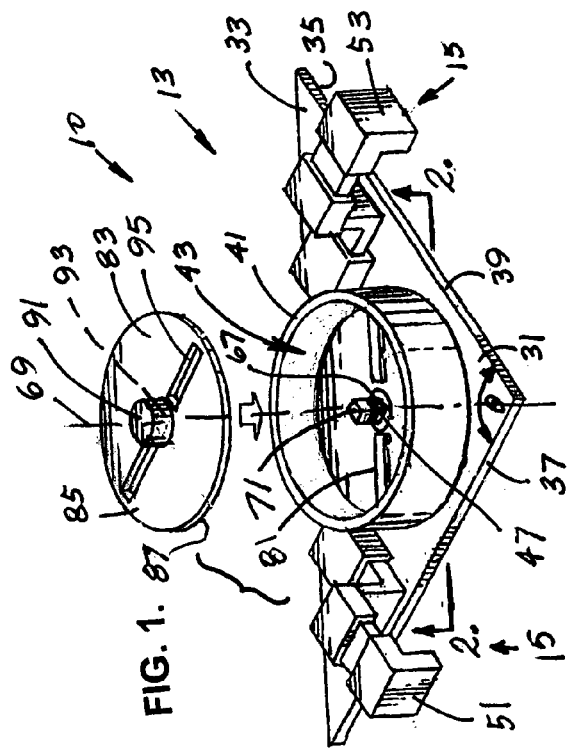

AUTOMATIC AQUARIUM FEEDER APPARATUS

BACKGROUND OF THE INVENTION

1. Field of the Invention

The present invention relates to aquariums and, more specifically without limitation, to accessories for aquariums.

2. Description of the Related Art

Fish require regular care in order to remain healthy. Over time, for instance, the tank of an aquarium can become filthy and unattractive. As a result, the water has to be emptied out of the tank so that the tank can be cleaned after which the tank must be filled with new water. Similarly, the filters of the tank need to be cleaned or changed and the fish must be fed.

However, remembering to feed the fish can be difficult at times. It is all too easy to forget to feed the fish, especially if the caretaker of the aquarium leads a busy life. Feeding the fish is also difficult if the aquarium caretaker is away on vacation. Then, recruiting a reliable helper to ensure that the fish are properly fed is vital to maintain the good health of the fish.

What is needed is a feeder that automatic feeds food to fish in an aquarium.

PRINCIPAL OBJECTS AND ADVANTAGES OF THE INVENTION

The principal objects and advantages of the present invention include: providing a feeder that automatic feeds food to fish in an aquarium; and generally providing such a feeder that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the present invention for an automatic feeder for adding fish food to an aquarium having two adjacent walls thereof forming an angle therebetween include a body unit, a clamping mechanism, a drive mechanism, and a food dispensing element.

The body unit includes a platform element having a first upper surface, a first lower surface, first and second sides adjacently situated relative to each other and forming an angle therebetween that is substantially equal to the angle between the two adjacent walls of the aquarium; a cylindrically shaped platform wall secured to, and extending upwardly from the first upper surface of the platform element and defining a cavity having a first diameter; and an orifice through the platform element wherein the orifice is located within the platform wall at a center of curvature of the platform wall.

The clamping mechanism includes a first clamping element that is secured to the first upper surface of the platform element and is located to releasably clamp one of the first or second sides of the platform element in substantially parallel relation to one of the two adjacent walls of the aquarium, and a second clamping element that is secured to the first upper surface of the platform element and is located to releasably clamp the other one of the first or second sides of the platform element in substantially parallel relation to the other one of the two adjacent walls of the aquarium.

The drive mechanism is secured to the lower surface of the platform element and includes an electric motor having a replaceable battery, a drive shaft that rotates about a vertical axis wherein the drive shaft has a distal end that extends above the first upper surface of the platform element, and a male connector secured to the distal end of the drive shaft.

The food dispensing element includes at least one first slot through the platform element wherein the at least one first slot extends generally radially between the orifice and the platform wall; a circularly shaped disk element having a second upper surface, a second lower surface, and a second diameter with a magnitude that is slightly smaller than the magnitude of the first diameter wherein the disk element includes a hub located at a center of curvature of the disk element with the hub including a downwardly facing female connector that drivingly mates with the male connector of the motor mechanism when the disk element is placed within the cavity such that the second lower surface of the disk element is spaced adjacently to the first upper surface of the platform element, and at least one second slot through the disk element wherein the at least one second slot extends generally radially between the hub and a periphery of the disk element such that the at least one second slot is alignable with the at least one first slot.

The automatic aquarium feeder apparatus is structured and configured such that fish food, placed on the disk element within the cavity, gravitationally falls through the at least one second slot and the at least one first slot as the motor drivingly rotates the disk element about the vertical axis such that the at least one second slot periodically aligns with the at least one first slot.

Alternatively, the drive mechanism of the automatic aquarium feeder apparatus may include a timing mechanism that is structured and configured to alternately connect the battery to the motor for a predetermined first time interval and disconnect the battery from the motor for a predetermined second time interval.

BRIEF DESCRIPTION OF THE DRAWINGS

FIG. 1 is an exploded, perspective view of an automatic aquarium feeder apparatus in accordance with the present invention.

FIG. 2 is a top plan view of the automatic aquarium feeder apparatus shown in FIG. 1.

FIG. 3 is a cross-sectional view of the automatic aquarium feeder apparatus, taken along line 2—2 of FIG. 1.

FIG. 4 is a top plan view of an embodiment of the automatic aquarium feeder apparatus for use with a hexagonally shaped aquarium in accordance with the present invention.

FIG. 5 is a top plan view of an embodiment of the automatic aquarium feeder apparatus for use with an octagonally shaped aquarium in accordance with the present invention.

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a feeder for adding fish food to an aquarium having two adjacent walls that form an angle therebetween in accordance with the present invention, as shown in FIGS. 1 through 5. The feeder 10 includes a body unit 13, a clamping mechanism 15, a drive mechanism 17, and a food dispensing mechanism 19.

The body unit 13 includes a platform element 31 having a first upper surface 33, a first lower surface 35, a first side 37, and a second side 39 wherein first and second sides 37, 39 are adjacently situated relative to each other, forming an angle, $\theta$, therebetween that is substantially equal to the angle between the two adjacent walls of the aquarium.

The body unit 13 also includes a cylindrically shaped platform wall 41 secured to, and extending upwardly from the first upper surface 33 of the platform element 31, defining a cavity 43 having a first diameter 45. An orifice 47 through the platform element 31, is located within the platform wall 41 at a center of curvature of the platform wall 41.

The clamping mechanism 15 includes a first clamping element 51 secured to the first upper surface 33 of the platform element 31. The first clamping element 51 is located to releasably clamp one of the first or second sides 37, 39 of the platform element 31 in substantially parallel relation to one of the two adjacent walls of the aquarium. The clamping mechanism 15 also includes a second clamping element 53 secured to the first upper surface of the platform element 31. The second clamping element 53 is located to releasably clamp the other one of the first or second sides 37, 39 of the platform element 31 in substantially parallel relation to the other one of the two adjacent walls of the aquarium.

The drive mechanism 17 secured to the first lower surface 35 of the platform element 31 and includes an electric motor 61 powered by a replaceable battery 63. The motor 61 has a drive shaft 65 with a distal end 67 that extends above the first upper surface 33 of the platform element 31 and rotates about a vertical axis 69. A male connector 71 is secured to the distal end 67 of the drive shaft 65.

The food dispensing mechanism 19 includes at least one first slot 81 through the platform element 31. The at least one first slot 81 extending generally radially from near the orifice 47 to near the platform wall 41.

The food dispensing mechanism 19 also includes a circularly shaped disk element 83 having a second upper surface 85, a second lower surface 87, and a second diameter 89 with a magnitude that is slightly smaller than the magnitude of the first diameter 45. The disk element 83 includes a hub 91 located at a center of curvature of the disk element 83. The hub 91 includes a downwardly facing female connector 93 that drivingly mates with the male connector 71 of the drive mechanism 17 when the disk element 83 is placed within the cavity 43 whereat the second lower surface 87 of the disk element 83 is spaced adjacently to the first upper surface 33 of the platform element 31.

The disk element 83 also includes at least one second slot 95 through the disk element 83. The at least one second slot 95 extends generally radially from near the hub 91 to near a periphery of the disk element 83 such that the at least one second slot 95 is alignable with the at least one first slot 81.

The feeder 10 is structured and configured such that fish food, placed on the disk element 83 within the cavity 43, gravitationally falls through the at least one second slot 95 and the at least one first slot 81 as the motor 61 drivingly rotates the disk element 83 about the vertical axis 69 such that the at least one second slot 95 periodically aligns with the at least one first slot 81.

The motor 61 may be geared down to rotate the disk element 83 very slowly about the vertical axis 69 such that the quantities of food that fall through the at least one second slot 95 and the at least one first slot 81 during a given period of time when they are aligned provides the food feeding rate desired for the fish in the aquarium on which the feeder 10 is installed.

Alternatively, the drive mechanism 17 may include a timing mechanism 97 that is structured and configured to alternately connect the battery 63 to the motor 61 for a predetermined first time interval followed by disconnecting the battery 63 from the motor 61 during a predetermined second time interval. For example, the timing mechanism 97 may energize the motor 61 as follows: on three minutes, off two days, on three minutes, off two days, etc.

For some applications, it may be desirable that the at least one first slot 81 includes two first slots 81. For other applications, it may be desirable that the at least one second slot 95 includes two second slots 95. For still other applications, it may be desirable that the at least one first slot 81 includes two first slots 81 and the at least one second slot 95 includes two second slots 95.

It is to be understood that the feeder 10 may be structured and configured for use with a rectangularly shaped aquarium as show in FIGS. 1 and 2, for use with a hexagonally shaped aquarium as shown in FIG. 4, for use with a octagonally shaped aquarium as shown in FIG. 5, or any other shape of aquarium including cylindrically shaped and oval shaped aquariums that have substantially vertical walls.

In an application of the automatic aquarium feeder apparatus 10, an appropriate embodiment of the present invention, depending on the shape of an aquarium being used, is positioned at the top of a corner of the aquarium. The first and second clamping elements are used to clamp about the top edges of the two adjacent walls of the aquarium that form the corner of the aquarium such that the platform element is held in a level orientation. Granular fish food is placed on the disk element within the cavity. As the motor drivingly rotates the disk element about the vertical axis such that the at least one second slot periodically aligns with the at least one first slot, fish food gravitationally falls from the cavity, through the at least one second slot, through the at least one first slot, and into the aquarium water containing the fish therebelow.

It is to be understood that while certain forms of the present invention have been illustrated and described herein, it is not to be limited to the specific forms or arrangement of parts as described and shown.

What is claimed and desired to be covered by Letters Patent is:

1. A feeder for adding fish food to an aquarium having two adjacent walls thereof forming an angle therebetween, the feeder comprising:
   (a) a body unit including:
      (1) a platform element having a first upper surface and a first lower surface, the platform element having first and second sides adjacently situated relative to each other and forming an angle therebetween that is substantially equal to the angle between the two adjacent walls of the aquarium,
      (2) a cylindrically shaped platform wall secured to, and extending upwardly from the first upper surface of the platform element, the platform wall defining a cavity having a first diameter, and (3) an orifice through the platform element, the orifice located within the platform wall at a center of curvature of the platform wall;

(b) a clamping mechanism including:
  (1) a first clamping element secured to the first upper surface of the platform element and located to releasably clamp one of the first or second sides of the platform element in substantially parallel relation to one of the two adjacent walls of the aquarium, and
  (2) a second clamping element secured to the first upper surface of the platform element and located to releasably clamp the other one of the first or second sides of the platform element in substantially parallel relation to the other one of the two adjacent walls of the aquarium;

(c) a drive mechanism secured to the lower surface of the platform element, the drive mechanism including:
  (1) an electric motor including a replaceable battery, the motor having a drive shaft that rotates about a vertical axis wherein the drive shaft has a distal end that extends above the first upper surface of the platform element, and
  (2) a male connector secured to the distal end of the drive shaft;

(d) a food dispensing element including:
  (1) at least one first slot through the platform element, the at least one first slot extending generally radially between the orifice and the platform wall,
  (2) a circularly shaped disk element having a second upper surface, a second lower surface, and a second diameter with a magnitude that is slightly smaller than the magnitude of the first diameter, the disk element including:
    (A) a hub located at a center of curvature of the disk element, the hub including a downwardly facing female connector that drivingly mates with the male connector of the motor mechanism when the disk element is placed within the cavity whereat the second lower surface of the disk element is spaced adjacently to the first upper surface of the platform element, and
    (B) at least one second slot through the disk element, the at least one second slot extending generally radially between the hub and a periphery of the disk element such that the at least one second slot is alignable with the at least one first slot; and (e) wherein fish food, placed on the disk element within the cavity, gravitationally falls through the at least one second slot and the at least one second slot as the motor drivingly rotates the disk element about the vertical axis such that the at least one second slot periodically aligns with the at least one first slot.

2. A feeder for adding fish food to an aquarium as described in claim 1, wherein the drive mechanism includes a timing mechanism that is structured and configured to alternately connect the battery to the motor during a predetermined first time interval, and disconnect the battery from the motor during a predetermined second time interval.

3. A feeder for adding fish food to an aquarium as described in claim 1, wherein the at least one first slot includes two first slots.

4. A feeder for adding fish food to an aquarium as described in claim 1, wherein the at least one second slot includes two second slots.

5. A feeder for adding fish food to an aquarium as described in claim 1, wherein the feeder is structured for use with a rectangularly shaped aquarium.

6. A feeder for adding fish food to an aquarium as described in claim 1, wherein the feeder is structured for use with a hexagonally shaped aquarium.

7. A feeder as described in claim 1, wherein the feeder is structured for use with a octagonally shaped aquarium.

* * * * *